United States Patent

[11] 3,552,571

| [72] | Inventors | Peter J. Neuspiel<br>Chicago, Ill.;<br>Milton Spiegel, Los Angeles, Calif. |
|---|---|---|
| [21] | Appl. No. | 862,753 |
| [22] | Filed | Oct. 1, 1969 |
| [45] | Patented | Jan. 5, 1971 |
| [73] | Assignee | FMC Corporation<br>San Jose, Calif.<br>a corporation of Delaware |

[54] ELECTROFLOTATION APPARATUS
6 Claims, 3 Drawing Figs.

[52] U.S. Cl. .................................................. 210/221,
210/520, 210/525
[51] Int. Cl. ................................................... B01d 21/24
[50] Field of Search ........................................... 210/44,
221, 520, 525

[56] References Cited
UNITED STATES PATENTS

| 1,069,169 | 8/1913 | Parker.......................... | 210/221X |
| 2,185,785 | 1/1940 | Dorr et al. ................... | 210/525X |
| 3,465,886 | 9/1969 | Pilarczyk...................... | 210/525X |
| 3,479,281 | 11/1969 | Kikindai et al................ | 210/221X |

*Primary Examiner*—J. L. DeCesare
*Attorneys*—F. W. Anderson and C. E. Tripp

ABSTRACT: A cylindrical-shaped tank has a grate of electrodes disposed horizontally across the open circular cross section thereof and at least one distributor arm is mounted to revolve in a horizontal plane above the grate of electrodes for evenly distributing liquid to be treated. By electrolysis of the liquid, a uniform upward flow of gas bubbles is produced to lift suspended solids and immiscible liquid to the surface of the liquid within the tank, while clarified liquid sinks downward between the bubbles towards the bottom of the tank.

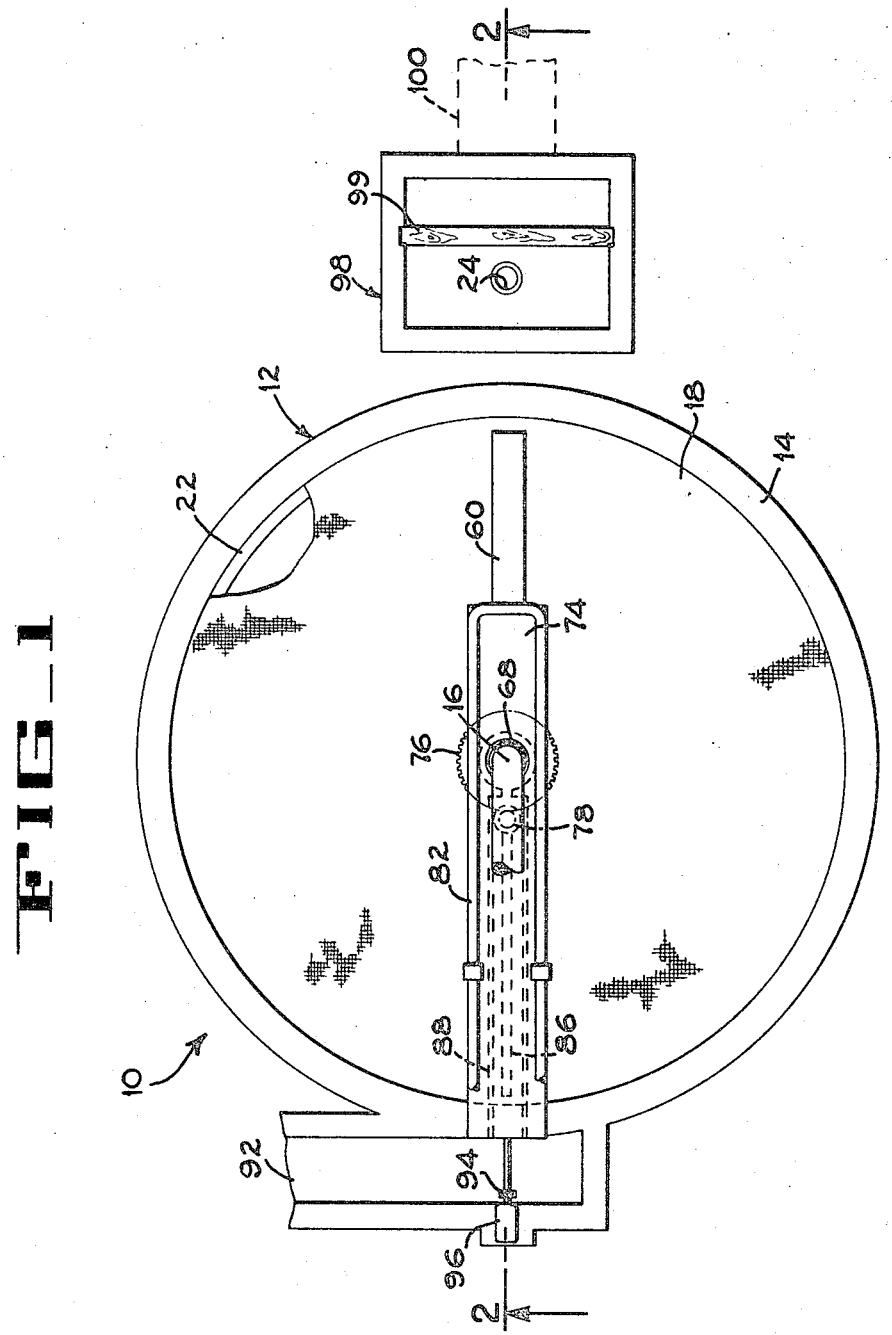

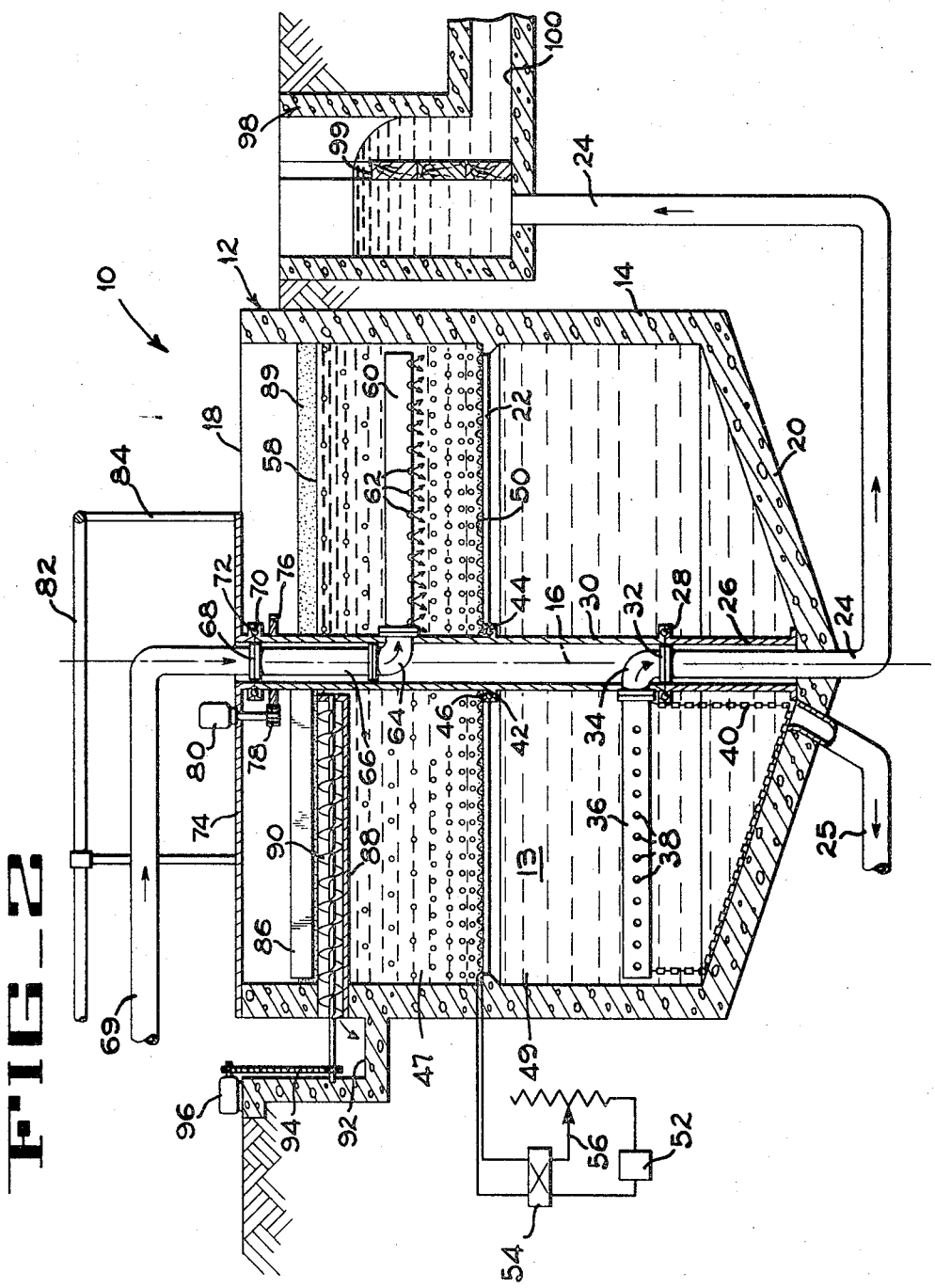
FIG_2

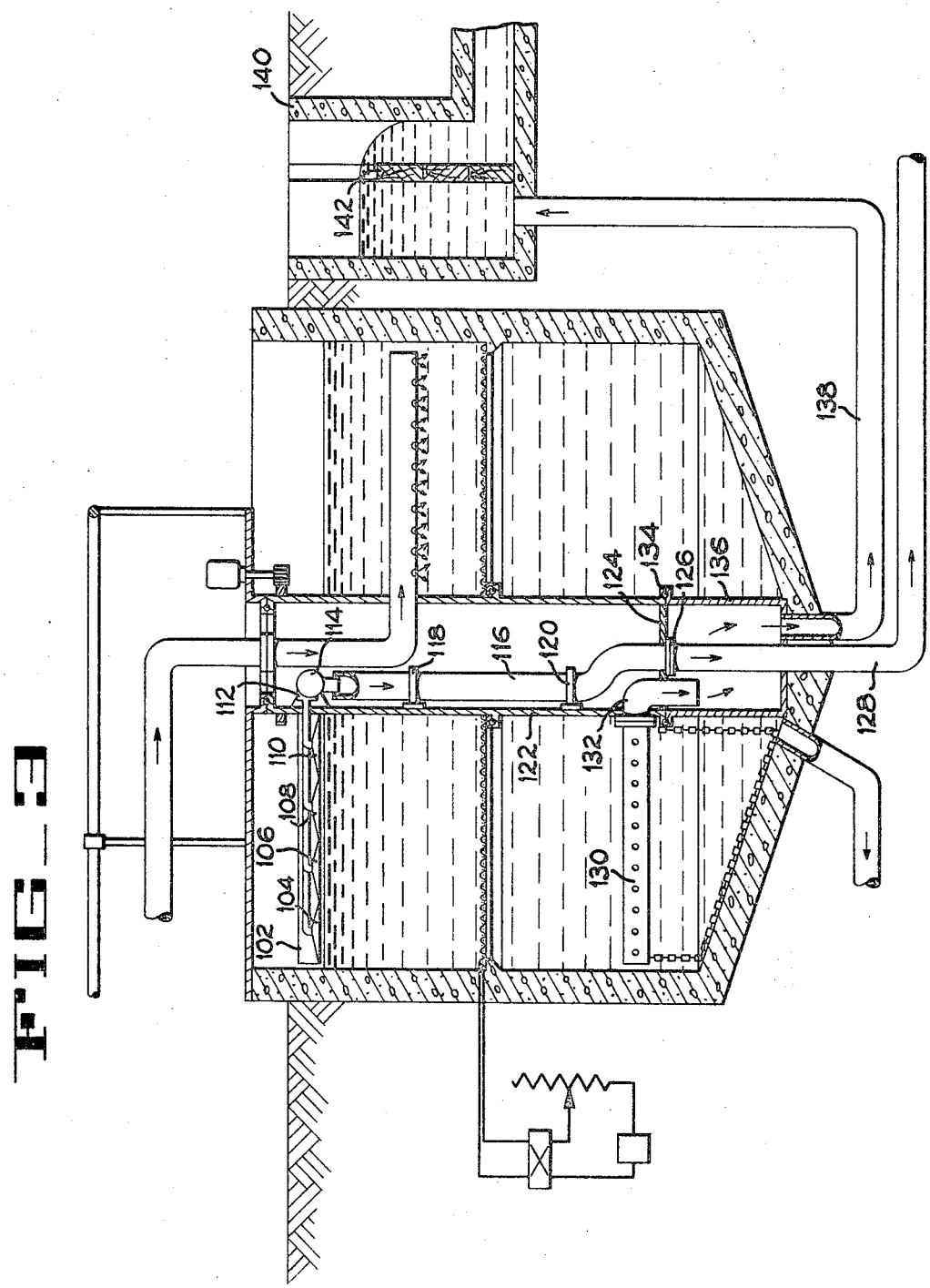

ELECTROFLOTATION APPARATUS

BACKGROUND OF THE INVENTION

1. Field of the Invention

This invention relates to apparatus for liquid purification or separation and more particularly, to equipment for precipitation by electrolytic flotation.

2. Description of the Prior Art

Flotation equipment has been used to separate liquid from suspended solids or immiscible liquid in suspension. Separation by flotation is more rapid than separation by sedimentation and thus, the size of treatment tanks can be reduced when using a flotation process. Electrolytic equipment has been used to produce a fine rising flow of gas bubbles for flotation but this equipment has been expensive to operate and there is a need to make such equipment more efficient.

Known electrolytic flotation tanks do not achieve maximum efficiency from the rising current of gas bubbles. One such tank has a rectangular configuration and liquid flows horizontally through the tank while rising bubbles lift impurities to the surface. In such a tank, there is unequal loading on the electrodes between the point where influent is introduced therein and the points where sludge and effluent are removed therefrom. At the influent entrance, the rising bubbles must contact and support the suspended solids before such solids descend to the depth of the electrodes, while as the solids move horizontally through the tank, they are supported by bubbles previously trapped thereunder and additional bubbles rising from the electrodes.

Another known tank provides a fixed grid of distribution pipes above the grate of electrodes. Turbulent currents are developed above the distribution pipes because no bubbles rise directly thereabove, while bubbles are rising on each side adjacent thereto. Thus, in that portion of the tank above the distribution pipes, currents are both rising and falling which create a turbulence that sometimes breaks up a floating blanket of sludge at the liquid surface. Furthermore, the fixed distribution pipes create an obstacle that is inconvenient when repairing or replacing the electrodes.

SUMMARY OF THE INVENTION

A cylindrical tank has a grate of electrodes disposed horizontally across the circular cross section thereof for producing a rising flow of gas bubbles by electrolysis. At least one distributor arm is spaced above the electrode grate and rotates about the vertical axis of the tank to evenly distribute liquid to be treated therein. Thus, the entire circular cross section of the tank is uniformly effective for floating impurities to the surface thereof and the rotating distributor arm does not interfere with replacement of sections of the electrode grate.

BRIEF DESCRIPTION OF THE DRAWING

FIG. 1 is a plan view of an electroflotation tank embodying the present invention.

FIG. 2 is a section taken on the line 2-2 of FIG. 1.

FIG. 3 is a diametrical section in elevation of a modified form of electroflotation tank in which the present invention is utilized.

DESCRIPTION OF THE PREFERRED EMBODIMENTS

With reference to FIGS. 1 and 2, electroflotation apparatus is indicated generally by reference numeral 10. A tank 12 has a generally cylindrical shape as defined by sidewall 14 and has a chamber 13 therein with a circular cross section aligned in horizontal planes perpendicular to a vertical center axis 16. The tank is open at the top portion 18 and enclosed at the bottom by a conical-shaped portion 20 that tapers downwardly towards the vertical center axis of the tank. Intermediately of the top and bottom portions of the tank, a ledge 22 projects radially inward from the sidewall for supporting electrodes as will later be described. An effluent discharge pipe 24 extends vertically through the conical-shaped portion about the vertical center axis and a grit removal pipe 25 extends through the conical shaped portion adjacent thereto.

A center column is formed within the tank 12 and includes a stationary base 26 mounted concentrically about effluent discharge pipe 24. A swivel joint 28 is provided at the uppermost end of the stationary base and a rotatable section 30 is mounted thereon. Connected to the top of effluent discharge pipe 24 is a swivel joint 32 and an elbow 34 extends through a 90° angle from the swivel joint to a point outside of the rotatable section. An effluent collection arm 36 is connected to the elbow and projects outward perpendicular to the rotatable section. This effluent collection arm is provided with a series of inlet openings 38 and a chain 40 is suspended therefrom to scrape the inner surface of the bottom conical-shaped portion 20.

A flange 42 projects radially outward from the rotatable section 30 at an elevation slightly below the level of ledge 22. An annular ball race is provided in the upper surface of the flange and ball bearings 44 are fitted therein. Resting upon the upper surfaces of the ball bearings but spaced from the rotatable section is a support ring 46 that remains stationary, while the rotatable section rotates. A grate of electrodes 50 is disposed horizontally within the tank and spans between the ledge and support ring. Thus, the grate divides the chamber 13 into an upper clarifying portion 47 and a lower clear well portion 49.

Various types of electrodes have been used in electroflotation tanks. The type illustrated in the drawings is a woven grille in which the wires of the warp are insulating, while the wires of the weft are conductive or vice versa. Such electrodes are produced by Saint Gobain Techniques Nouvelles, a French societe anonym of Paris, France. The conductive wires can be made from stainless steel or platinum-coated titanium. Every other conductive wire is connected to the positive pole of a generator 52 and each alternate conductive wire is connected to the negative pole of the generator. A change over switch 54 is provided between the generator and electrodes to reverse the current for cleaning the electrodes. A rheostat 56 is provided in the circuit to vary the current passing to the electrodes and thus regulate the rate of bubble production for the particular liquid being treated.

Electrodes 50 are located at a depth of 2 to 4 feet below the liquid surface 58 within tank 12 and positioned above the electrodes by a distance of from 1 to 2 feet is a distributor arm 60 that projects outward perpendicular to the rotatable section 30. Discharge openings 62 are located at spaced intervals along the arm for evenly distributing influent above the electrodes. The distributor arm is connected to an elbow 64 that makes a 90° bend within the rotatable section and a pipe 66 is connected therewith extending to the uppermost end of the rotatable section and coaxial therewith. A swivel joint 68 connects pipe 66 to an influent supply pipe 69 through which influent is pumped into the tank.

A swivel joint 70 connects the rotatable section 30 to a base ring 72 that supports one end of a catwalk 74. The opposite end of the catwalk is supported by the tank sidewall 14. Thus, it will be seen that the rotatable section supports the base ring but is free to rotate thereunder, while the base ring remains stationary. The rotatable section is rotated by a ring gear 76 that projects radially outward therefrom and a drive gear 78, in mesh therewith, mounted on the drive shaft of a motor 80 supported by the catwalk. A handrail 82 is positioned around the perimeter of the catwalk and supported thereabove by posts 84.

A sludge collection arm 86 projects radially outward from the rotatable section 30 at a location slightly above the liquid surface 58 in the tank. This sludge collection arm revolves with the rotatable section in a horizontal plane about the vertical center axis 16 of the tank. The arm has a triangular vertical cross section with the base of the triangle located at the top of the arm and the point projecting downward towards the liquid surface to minimize interference with rising sludge.

A sludge collection trough 88 projects radially inward from the tank sidewall 14 and is located at an elevation whereby the top of the trough is at the same level as the liquid surface 58. A sludge blanket 89 which forms above the liquid surface 58 is skimmed into the trough upon rotation of the sludge collection arm 86. Within the trough, a screw conveyor 90 moves sludge towards a gutter 92 located outside of sidewall 14 and extending tangential thereto. The screw conveyor is driven by a drive train 94 that connects the drive shaft of the conveyor with the drive shaft of a motor 96.

Discharge pipe 24 extends from the bottom of tank 12 to a level control tank 98 wherein a weir 99 being adjustable in height is located to regulate the effluent flow from tank 12 to a drain pipe 100. The top of the weir is positioned at an elevation to allow for the head loss due to friction in the discharge pipe and the desired velocity head for the quantity of effluent discharged to the drain pipe.

In operation, influent is pumped through influent supply pipe 69, pipe 66 and distributor arm 60 where it is discharged evenly through openings 62. Since the distributor arm turns with rotatable section 30, influent is spread evenly over the entire open cross-sectional area above the grate of electrodes 50. Electrolysis of the liquid produces a fine rising flow of gas bubbles from the electrodes that contact suspended solids and immiscible liquid and lifts such particles to the liquid surface 58 within the tank 12. Here, these particles collect to form a scum which is a blanket of sludge 89 buoyed by air bubbles trapped beneath. Clear liquid filters between the rising bubbles and through the electrodes to the bottom portion of the tank. Effluent is drawn from the bottom of the tank through inlet openings 38 in collection arm 36. Since the collection arm turns with the rotatable section, effluent is evenly collected from the tank so as not to induce currents toward a point as would be the case if there was but one fixed drain. Effluent flows through discharge pipe 24, over weir 99 and out drain pipe 100.

Chain 40 scrapes the bottom conical shaped portion 20 to cause grit to roll to a low point where it is removed through grit removal pipe 25. The sludge collection arm 86 skims the sludge into collection trough 88 where it is moved out side of the tank by screw conveyor 90 to gutter 92 for discharge. Liquid surface 58 within tank 12 is controlled by adjusting the elevation of weir 99 in relationship to the rate of flow of influent into the tank. By adjusting rheostat 56, the rate of rising bubbles can be controlled for the quality of the liquid being treated.

A modified form of the invention is shown in FIG. 3 and is distinguished from the electroflotation apparatus 10 by different means for sludge collection and discharge. Sludge collection arm 102 contains vacuum heads 104, 106, 108 and 110 which are connected by separate vacuum lines to a manifold 112. A pump 114 provides suction on the manifold to draw sludge from the liquid surface and discharge the sludge into drain pipe 116 located below the pump. Braces 118 and 120 hold the drain pipe to the interior sidewall of a rotatable center column section 122 which is enclosed at the bottom by a cover plate 124. Drain pipe 116 bends outward from the interior sidewall and passes through the bottom cover plate coaxial with the rotatable section. A swivel joint 128 connects the drain pipe to sludge discharge pipe 128.

An effluent collection arm 130 is connected to an elbow 132 that fits through rotatable section 122 and bottom cover plate 124. A swivel joint 134 connects the rotatable section with a stationary base 136 which also acts as a conduit for effluent. Discharge pipe 138 extends between the interior of the stationary base and a level control tank 140. Weir 142 located within the level control tank is adjustable in elevation and thereby controls the fluid level within and discharge flow from the treatment tank.

Operation of the modified electroflotation apparatus shown in FIG. 3 is similar to that previously described with the exception that sludge is sucked from the liquid surface and conveyed through drain pipe 116 to sludge discharge pipe 128. Effluent collected by arm 130 is discharged within stationary base 136 and from there passes through discharge pipe 138 to level control tank 140.

Although the best mode contemplated for carrying out the present invention has been herein shown and described, it will be apparent that modification and variation may be made without departing from what is regarded to be the subject matter of the invention.

We claim:

1. Apparatus for the purification of liquid by electroflotation comprising: a cylindrical-shaped tank having a chamber therein with a circular horizontal cross section; a grate of electrodes disposed horizontally within the tank chamber dividing the chamber into an upper clarifying portion and a lower clear well portion; said grate of electrodes producing a uniform upward flow of gas bubbles by electrolysis of liquid treated in the chamber; and at least one distributor arm spaced above the grate of electrodes and mounted to revolve in a horizontal plane about the vertical center axis of the tank for evenly distributing liquid to be treated with each revolution over the cross section of the chamber above the grate of electrodes, whereby the uniform upward flow of gas bubbles produced by the grate of electrodes lifts suspended solids and immiscible liquid to the surface of liquid within the tank, while clarified liquid passes between the bubbles and sinks to the bottom of the tank.

2. The apparatus described in claim 1 including a sludge collection arm located adjacent the surface of liquid in the tank and mounted to revolve in a horizontal plane about the vertical center axis of the tank, and means for withdrawing sludge collected at said arm.

3. The apparatus described in claim 2, wherein said sludge withdrawal means includes a sludge collection trough extending radially inward from the circumference of the tank aligned at the liquid surface and wherein said sludge collection arm acts as a skimmer blade to push sludge accumulating at the surface of the liquid into the sludge collection trough.

4. The apparatus described in claim 2, wherein said sludge withdrawal means comprise a series of vacuum heads mounted on the sludge collection arm for sucking sludge from the liquid surface within the tank.

5. The apparatus described in claim 2 including at least one effluent collection arm located below the grate of electrodes and mounted to revolve in a horizontal plane about the vertical center axis of the tank for collecting effluent evenly therefrom.

6. The apparatus described in claim 5 wherein said cylindrical tank has a conical-shaped bottom tapering downward towards the vertical center axis of the tank and means depend from the effluent collection arm to scrape the conical-shaped bottom as the arm revolves for moving grit towards a location for collection.